April 5, 1927.
R. H. BEEBE
BRAKE
Filed Aug. 7, 1926    2 Sheets-Sheet 1
1,623,380
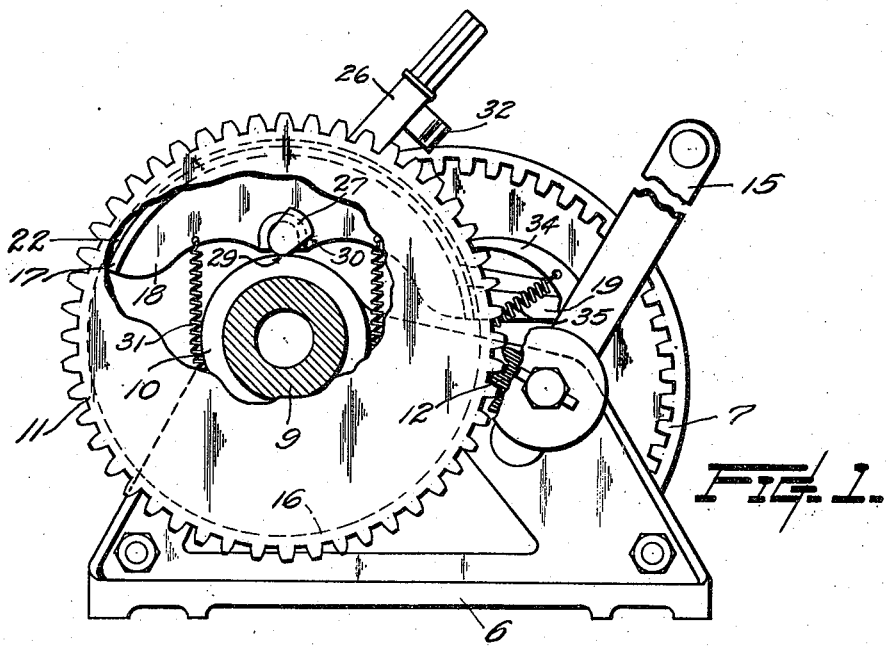
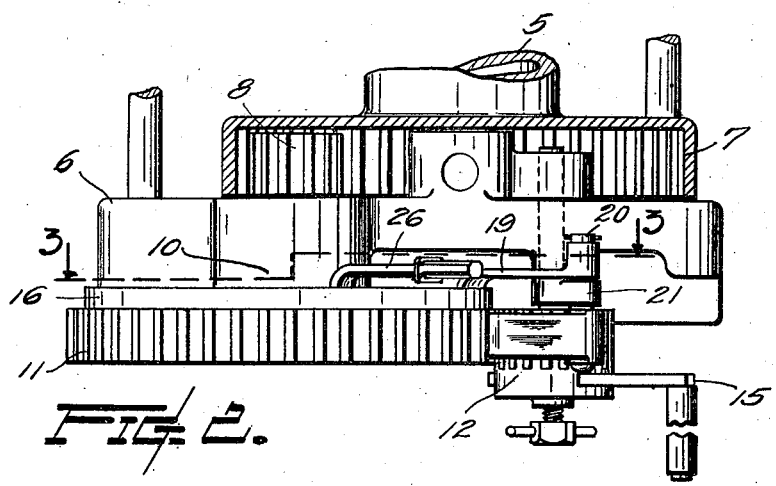
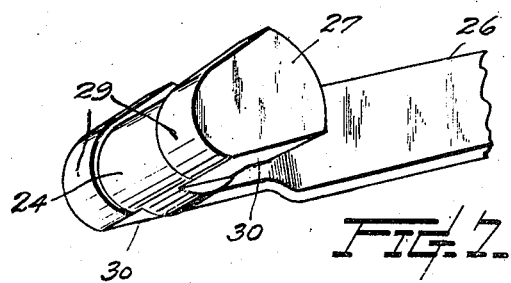
INVENTOR
R. H. Beebe
BY
ATTORNEY April 5, 1927. 1,623,380
R. H. BEEBE
BRAKE
Filed Aug. 7, 1926 2 Sheets-Sheet 2
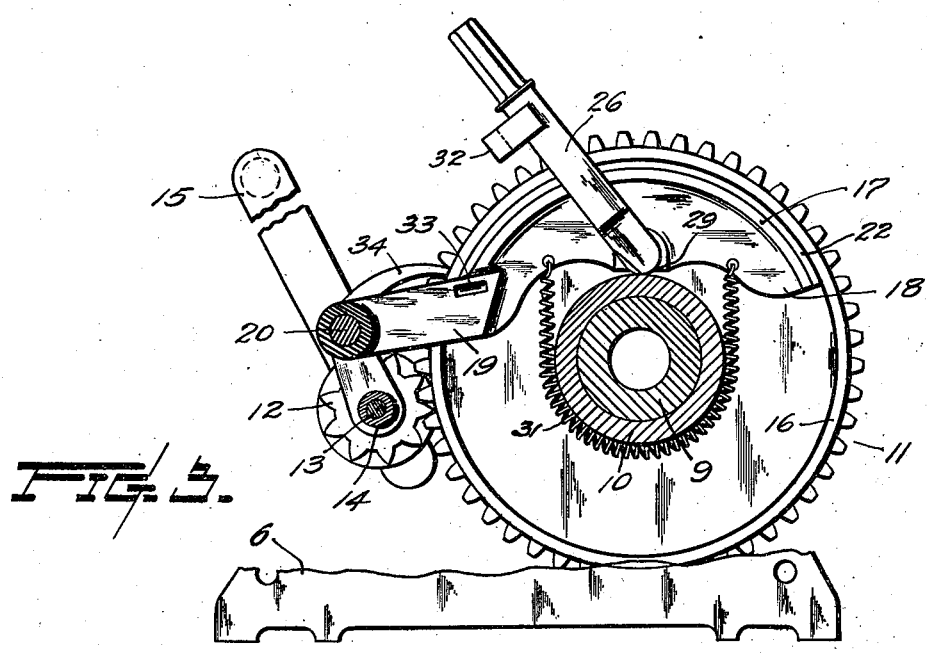
FIG. 3.
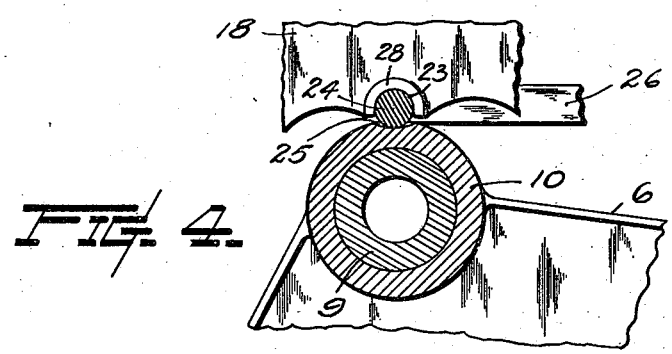
FIG. 4.
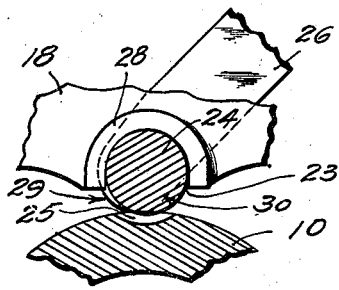
FIG. 5.
FIG. 6.
INVENTOR
R. H. Beebe
BY
ATTORNEY Patented Apr. 5, 1927.

1,623,380

UNITED STATES PATENT OFFICE.

ROBERT H. BEEBE, OF SEATTLE, WASHINGTON.

BRAKE.

Application filed August 7, 1926. Serial No. 127,779.

This invention relates to brake mechanism for hoists and more particularly to brakes of the type outlined in patent application, Serial No. 752,421, filed by me November 26, 1924.

The general object of my invention is to provide a brake mechanism which will be strong, durable and efficient in operation, convenient to manipulate, and one which will afford important advantages over other brake systems hitherto in use.

More specific objects and advantages of the invention will appear in the following description.

The invention consists in the novel construction, adaptation and combination of parts hereinafter described and claimed.

In the accompanying drawings,—

Figure 1 is an end elevation of a hoisting machine with the brake mechanism embodying my invention applied thereto, parts of operating gears of the machine being broken away and the intermediate shaft shown in transverse section; Fig. 2 is a plan view, partly in section, of a portion of the machine shown in Fig. 1, the section being taken through the internal gear; Fig. 3 is a transverse vertical section taken mainly on broken line 3—3 of Fig. 2; Fig. 4 is a fragmentary transverse vertical section of parts represented in Fig. 3, but seen in the opposite direction; Figs. 5 and 6 are sectional detail views illustrating the cam action of the brake lever; and Fig. 7 is a fragmentary perspective view of the brake lever.

In the drawings, is shown so much of a hoisting machine, or hoist, as is requisite to illustrate my improved brake mechanism. The reference numeral 5 represents the winding drum and 6 represents, generally, the frame of the machine.

Rigidly secured to or formed integral with said drum is an integral gear 7 whereby the drum is driven through the medium of a spur pinion 8 (Fig. 2) upon a shaft 9 which is rotatable in a journal box element 10 of the machine frame.

This shaft 9 may be rotated directly by means of a manually operated crank, as explained in the patent application above mentioned; or, as herein shown, by means of a spur gear wheel 11 mounted upon the shaft 9 in mesh with a pinion 12 mounted upon a shaft 13 which is journaled in a bearing box 14 of the frame. 15 represents a crank handle for rotating the shaft 13 and pinion 12 to transmit motion through the gears 11, 8 and 7 to operate the winding drum 5. The teeth of the gear wheel 11 are disposed peripherally about the wheel rim which constitutes a brake drum with an internal gripping surface.

Cooperating with said drum is a rigid member constituting a brake-shoe having an arcuate upper portion 17, a web portion 18 and an arm 19 extending from said web as shown in Figs. 2 and 3. At one side of the brake drum, said arm is pivotally connected to a stud 20 which is mounted in the frame or in an attachment, such for instance as 21, which is rigid with the frame. The brake shoe is provided with a lining 22, the shoe being of a shape to cause the lining to contact throughout its length with the brake drum when the shoe is brought into operative relation with the drum. The lining 22 constitutes, in effect, a part of the brake shoe, and both will hereinafter be included in the term "brake-shoe" or "shoe".

In its underside, the shoe web 18 is provided with a recess 23 to receive a roller 24, which latter is also received in a slot 25 provided in the frame journal box 10. This roller 24 forms an element of a brake lever, the operating arm 26 thereof extending from one end of the roller at right angles, or nearly so with respect to the roller axis.

At the other end of the roller said lever is provided with a finger 27 which is spaced from the arm 26 to receive therebetween the boss-element 28 of the shoe web.

The positioning of the shoe web between the arm and finger elements of the operating lever serves to connect the latter with the brake shoe against any relative displacement axially of the roller.

In proximity of the roller element 24 the finger 27 and arm 26 are formed with cam faces 29 and 30, the faces 29 being arranged with respect to the roller axis so that, when the operating lever is swung upwardly into the position in which it is represented in Figs. 1, 3 and 5, the faces 29 will bear upon the journal box at opposite sides of the slot 25 to act thereon as a fulcrum for elevating the roller element to actuate the shoe for setting the brake. The other faces 30, see Fig. 7, are arranged so that when the lever occupies substantially the position in which it is represented in Figs. 4 and 6, the roller element is permitted to enter the frame slot 25 for lowering the shoe to disengage the brake.

The retractile movement of the brake shoe to release the brake drum is facilitated by the employment of a spring such, for example, as 31 connected to the shoe and extending about the underside of the frame part 9. For releasably securing the brake-lever in its inoperative relation, a hook 32 is provided thereon for engaging a lug catch 33 provided on the brake shoe arm 19.

34 represents a dog which is yieldingly held by means of a spring 35 in engaging relation with respect to the teeth of the gear wheel 11.

It will be apparent from the above description that the brake mechanism is disengaged by the action of gravitation and the spring 31 when the brake operating lever is in position to have its roller element 24 extend into the frame slot 25 as shown in Figs. 4 and 6.

In such a condition, the operating lever is engaged through the medium of the hook element 32 thereof and the catch element 33 of the brake shoe arm 19, hence the spring 31 acts to prevent the operating lever kicking up, so to speak, to accidentally apply the brake.

The brake lever is released from the catch by the operator pushing the operating lever horizontally slightly away from the shoe arm before undertaking to raise the lever into brake actuating relation with respect to the shoe. In thus moving the brake lever the cam faces 29 of the lever engage the frame part 10 at opposite sides of the slot 25 whence the roller is elevated to force upwardly the brake shoe to apply the same. It is to be noted that the brake is set by cams acting between the frame and the brake shoe, the actuating force being applied medially of the diameters of the drum and the shaft thereof. It is also to be noted that the brake shoe is pivotally connected by means of its arm with a support on the machine frame exteriorly of the drum and in a manner to enable the brake shoe to be swung into and from its drum engaging position.

The construction and operation of the invention will, it is believed, be understood from the foregoing description.

What I claim, is,—

1. In brake mechanism, the combination with a machine frame, a rotary drum, a shaft therefor mounted in said frame, a brake shoe having an arm pivotally connected to said frame externally of the drum, and brake shoe operating means comprising a lever adapted to be held by said shoe in operable relation upon said frame, said lever being provided with cam elements which are cooperable with the frame for effecting the engagement of the shoe with said drum.

2. In brake mechanism as defined in claim 1, wherein a spring is employed to retract the brake shoe from the drum when the lever is being moved into its inoperative relation with respect to the brake shoe.

3. In brake mechanism as defined in claim 1 wherein a spring is employed for retracting the brake shoe from the drum, and means are provided for releasably connecting the lever to the arm of the brake shoe, whereby the spring acting through the medium of the brake shoe tends to render the lever inoperable to actuate the brake shoe.

4. In brake mechanism, the combination with a machine frame provided with a journal box element, said box element having a slot therein, a shaft rotatable in said journal box, a brake drum carried by said shaft, a brake shoe provided within said drum, a spring tending to retain the shoe in its inoperative relation with respect to the drum, and brake shoe operating means, comprising a lever having a shoe-engaging portion adapted to enter said slot, and provided with means cooperable with the journal box for applying the shoe-engaging portion of the lever to set the brake.

5. In brake mechanism, a frame, a brake drum rotatably mounted on the frame, a brake shoe including a brake lining applied thereto, said shoe being shaped to cause the lining to contact with the drum throughout the extent of the shoe when brought into engageable relation with the drum, an arm integral with said shoe, means for pivotally connecting said arm externally of the drum and on said frame, and a brake operating lever having a cam cooperable with the frame for actuating said shoe.

6. In brake mechanism, a frame, a brake drum mounted for rotation on said frame, a rigid brake shoe including a brake facing applied thereto, the brake shoe being shaped to cause the lining to contact with the drum throughout the extent of the shoe when the shoe is moved into engaging relation with the drum, means for pivotally connecting the shoe externally of the drum on said frame, and a brake lever for operating the shoe, said lever having cams cooperable with the frame and adapted to engage the shoe at the central portion thereof.

Signed at Eustis, Nebraska, this 14th day of June, 1926.

ROBERT H. BEEBE.